(12) United States Patent
Nguyen et al.

(10) Patent No.: US 10,137,510 B1
(45) Date of Patent: Nov. 27, 2018

(54) ROTARY CUTTING TOOL HAVING AXIALLY SUPPORTED LEAD CUTTING INSERT AND A CONTINUOUS CUTTING EDGE

(71) Applicant: Ingersoll Cutting Tool Company, Rockford, IL (US)

(72) Inventors: Eric William Nguyen, South Beloit, IL (US); William B. Johnson, Machesney Park, IL (US); Dennis Etienne Roepsch, Cherry Valley, IL (US)

(73) Assignee: Ingersoll Cutting Tool Company, Rockford, IL (US)

( * ) Notice: Subject to any disclaimer, the term of this patent is extended or adjusted under 35 U.S.C. 154(b) by 104 days.

(21) Appl. No.: 15/586,647

(22) Filed: May 4, 2017

(51) Int. Cl.
 *B23C 5/20* (2006.01)
(52) U.S. Cl.
 CPC ........ *B23C 5/20* (2013.01); *B23C 2200/0433* (2013.01); *B23C 2200/367* (2013.01); *B23C 2210/168* (2013.01)
(58) Field of Classification Search
 CPC ........ B23C 2210/168; B23C 2200/367; B23C 5/20
 See application file for complete search history.

(56) References Cited

U.S. PATENT DOCUMENTS

| 4,285,618 | A | 8/1981 | Shanley, Jr. |
| 4,790,693 | A | 12/1988 | Koblesky |
| 5,944,456 | A | 8/1999 | Shirley et al. |
| 6,659,694 | B1 | 12/2003 | Asbell et al. |
| 6,773,209 | B2 | 8/2004 | Craig |
| 6,921,233 | B2 | 7/2005 | Duerr et al. |
| 6,976,811 | B1 | 12/2005 | DeRoche et al. |
| 7,073,987 | B2 | 7/2006 | Hecht |
| 7,094,007 | B2 | 8/2006 | Satran et al. |
| 7,104,736 | B2 | 9/2006 | Satran et al. |
| 7,241,082 | B2 | 7/2007 | Smilovici et al. |

(Continued)

FOREIGN PATENT DOCUMENTS

| JP | H05 60719 U | 8/1993 |
| JP | 5779830 B2 | 9/2015 |
| WO | WO 2016/147493 A1 | 9/2016 |

OTHER PUBLICATIONS

International Search Report dated Jul. 23, 2018, issued in PCT counterpart application (No. PCT/IL2018/052800).

(Continued)

*Primary Examiner* — Alan Snyder
(74) *Attorney, Agent, or Firm* — Womble Bond Dickinson (US) LLP (57) ABSTRACT

A rotary cutting tool has a cutting body and a plurality of cutting inserts, including a first insert removably secured in a first pocket and a second insert removably secured in a second pocket. The first pocket opens out at a forward end surface of the cutting body, having a seat surface with an axial support wall transverse thereto, and the second pocket is located axially rearward of the first pocket. The first insert has opposing front and back end surfaces, with a peripheral side surface extending therebetween which is in contact with the seat surface and the axial support wall. A first major cutting edge of the first insert axially overlaps with a second major cutting edge of the second insert, and in a side view of the cutting tool, a raised shoulder surface adjacent the axial support wall is at least partially obscured by the second insert.

34 Claims, 7 Drawing Sheets

(56) References Cited

U.S. PATENT DOCUMENTS

| | | |
|---|---|---|
| 7,246,973 B2 | 7/2007 | Johnson et al. |
| 7,367,753 B2 | 5/2008 | Maurer |
| 7,560,068 B2 | 7/2009 | Smilovici et al. |
| 8,449,230 B2 | 5/2013 | Nguyen et al. |
| 8,696,257 B2 | 4/2014 | Saito et al. |
| 8,753,045 B2 | 6/2014 | Hecht |
| 8,876,440 B2 | 11/2014 | Nam et al. |
| 9,186,732 B2 | 11/2015 | Michelete et al. |
| 2002/0085887 A1 | 7/2002 | Schneider et al. |
| 2003/0223828 A1 | 12/2003 | Craig |
| 2003/0223829 A1 | 12/2003 | Craig |
| 2005/0063792 A1 | 3/2005 | Satran |
| 2010/0047026 A1 | 2/2010 | Horiike et al. |
| 2011/0129309 A1 | 6/2011 | Kovac et al. |
| 2011/0280673 A1 | 11/2011 | Degany |
| 2014/0169893 A1 | 6/2014 | Fang et al. |
| 2016/0031020 A1 | 2/2016 | Francis et al. |
| 2017/0014918 A1 | 1/2017 | Aso |

OTHER PUBLICATIONS

Written Opinion dated Jul. 23, 2018, issued in PCT counterpart application (No. PCT/IL2018/052800).

ROTARY CUTTING TOOL HAVING AXIALLY SUPPORTED LEAD CUTTING INSERT AND A CONTINUOUS CUTTING EDGE

FIELD OF THE INVENTION

The present invention relates to a rotary cutting tool with a plurality of cutting inserts providing a continuous effective cutting edge along a single chip flute, for use in metal cutting processes in general, and for milling operations in particular.

BACKGROUND OF THE INVENTION

Within the field of rotary cutting tools used in milling operations, there are many examples of a plurality of cutting inserts arranged along a single chip flute to provide a continuous effective cutting edge.

U.S. Pat. No. 4,790,693 discloses a milling tool with a plurality of identical indexable side station inserts in an inter-fitting arrangement along a single chip gullet, and a single non-indexable end ("first" or "lead") station insert having a cutting edge which axially overlaps with the operative cutting edge of the adjacent side station insert.

U.S. Pat. No. 8,696,257 discloses a milling tool with a plurality of identical side and end station inserts arranged along a single chip removing flute, each insert indexable about a center line extending through its rake surface and V-shaped seating surface.

It is an object of the present invention to provide an improved milling tool.

It is also an object of the present invention to provide an improved milling tool having a plurality of indexable cutting inserts arranged along a single chip flute.

It is a further object of the present invention to provide an improved milling tool in which the end station insert is removably secured in an end station pocket with a high level of stability.

SUMMARY OF THE INVENTION

In accordance with the present invention, there is provided a cutting tool rotatable about a tool axis defining a forward-rearward direction and having a direction of rotation, the cutting tool comprising:
  a cutting body having;
  a forward end surface;
  a first insert receiving pocket opening out at the forward end surface and having a first insert seat surface with a first insert axial support wall transverse thereto,
  a second insert receiving pocket located axially rearward of the first insert receiving pocket and having a second insert seat surface; and
  a raised shoulder surface adjacent the first insert axial support wall;
  a first cutting insert removably secured in a first insert receiving pocket, the first cutting insert having opposing first insert front and back end surfaces with a first insert peripheral side surface extending therebetween and a first insert axis extending therethrough, and at least one first insert front major cutting edge formed at the intersection of the first insert front end surface and the first insert peripheral side surface,
  a second cutting insert removably secured in a second insert receiving pocket the second cutting insert having opposing second insert front and back end surfaces with a second insert peripheral side surface extending therebetween and a second insert axis extending therethrough, and at least one second insert front major cutting edge formed at the intersection of the second insert front end surface and the second insert peripheral side surface,
  wherein:
    the first insert seat surface contacts a first portion of the first insert peripheral side surface,
    the first insert axial support wall contacts a second portion of the first insert peripheral side surface,
    one of the at least one first insert front major cutting edge is operative and one of the at least one second insert front major cutting edge is operative,
    a second tool plane perpendicular to the tool axis intersects the operative first insert front major cutting edge and the operative second insert front major cutting edge, and
    in a side view of the cutting tool perpendicular to the tool axis, the raised shoulder surface is at least partially obscured by the second cutting insert.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

As shown in FIGS. 1 to 8, the present invention relates to a cutting tool 20 rotatable about a tool axis AT, having a cutting body 22 and a plurality of cutting inserts 24, 26 including a first, or "lead" cutting insert 24 removably secured in a first insert receiving pocket 28 and a second cutting insert 26 removably secured in a second insert receiving pocket 30.

Figure 1:
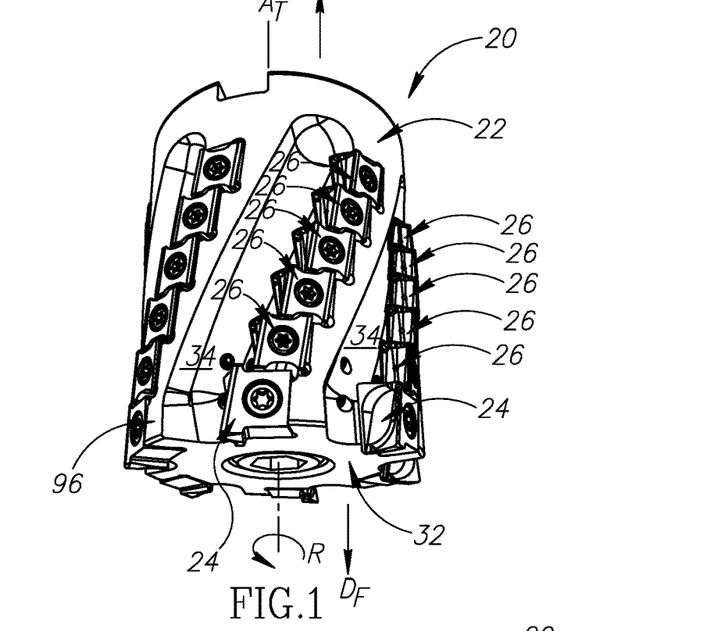
FIG. 1 is a perspective view of a cutting tool in accordance with some embodiments of the present invention.
Figure 3:
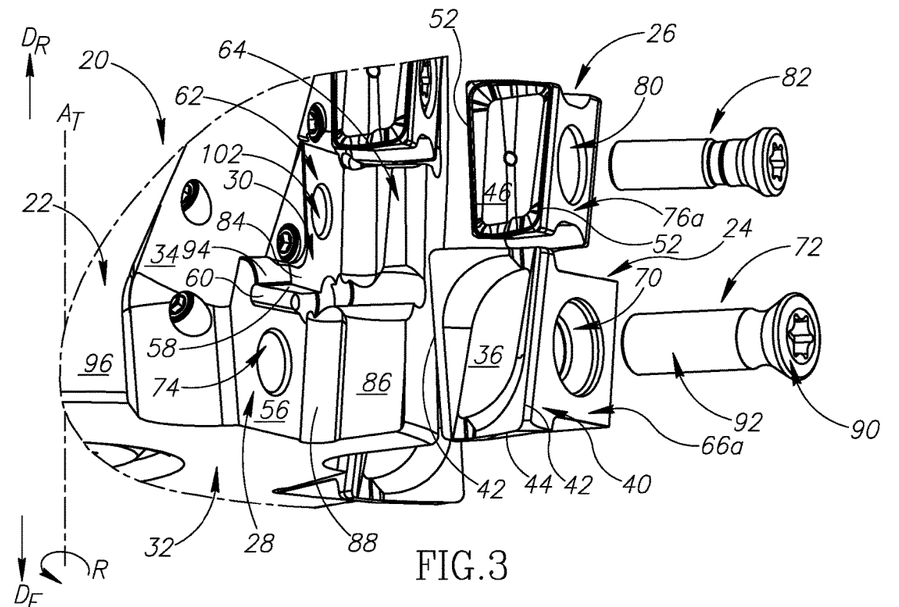
FIG. 3 is a detailed exploded view of the cutting tool shown in FIG. 1.

As shown in FIGS. 1 and 3, the tool axis AT defines a forward-rearward direction $D_F$, $D_R$, and the cutting tool 20 has a direction of rotation R about the tool axis AT.

In some embodiments of the present invention, the first and second cutting inserts 24, 26 may preferably be manufactured by form pressing and sintering a cemented carbide, such as tungsten carbide, and may be coated or uncoated.

Also in some embodiments of the present invention, the first and second cutting inserts 24, 26 may be different from each other.

As shown in FIGS. 1 to 5, the first insert receiving pocket 28 opens out at a forward end surface 32 of the cutting body 22, and the second insert receiving pocket 30 is located axially rearward of the first insert receiving pocket 28.

In some embodiments of the present invention, a helical chip flute 34 may extend axially rearwardly from the forward end surface 32 of the cutting body 22, and the first and second insert receiving pockets 28, 30 may communicate with the helical chip flute 34.

Figure 2:
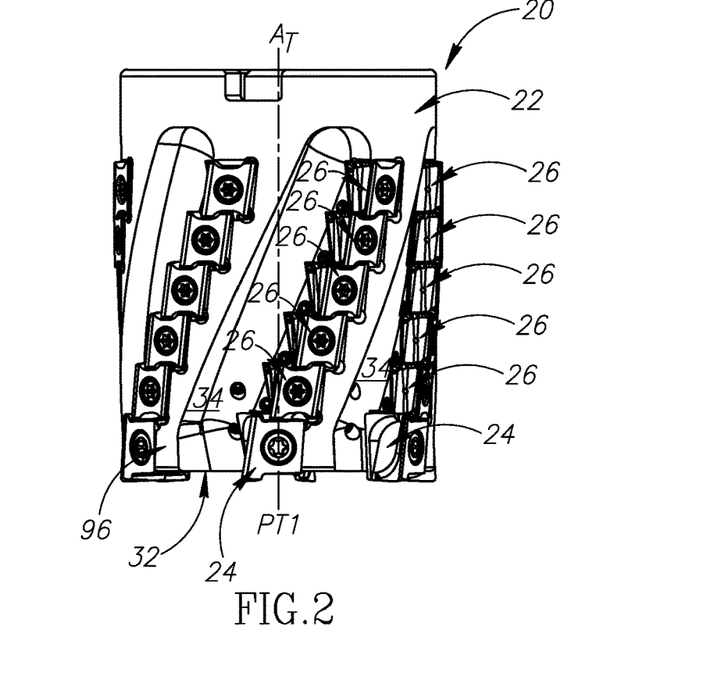
FIG. 2 is a side view of the cutting tool shown in FIG. 1.
Figure 4:
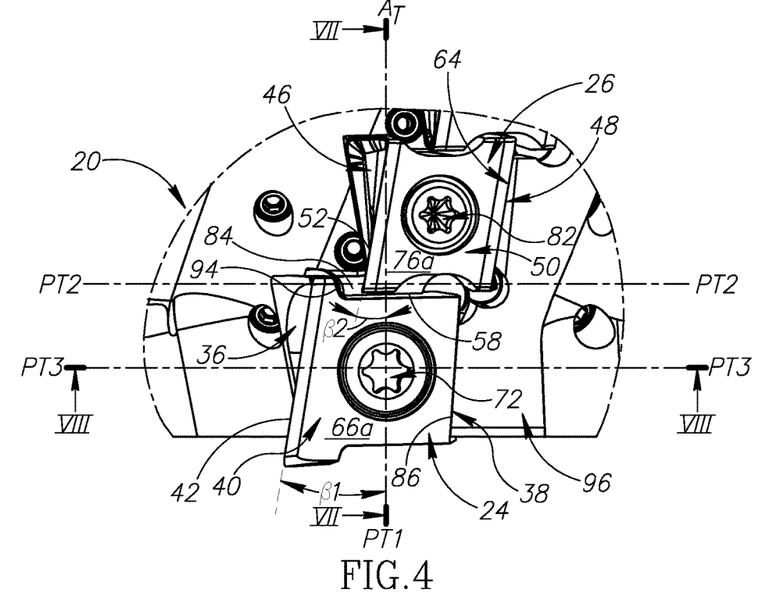
FIG. 4 is a detailed side view of the cutting tool shown FIG. 2.

Also in some embodiments of the present invention, as shown in FIGS. 2 and 4, a first tool plane PT1 containing the tool axis AT may intersect the first and second cutting inserts 24, 26.

It should be appreciated that configuring the first tool plane PT1 to intersect the first and second cutting inserts 24, 26 such that the first and second cutting inserts 24, 26 circumferentially overlap, advantageously enables the helix angle of the chip flute 34 to be minimized and thus the total number of chip flutes 34 formed in the cutting body 22 to be maximized.

As shown in FIGS. 9 to 12, the first cutting insert 24 has opposing first insert front and back end surfaces 36, 38 with a first insert peripheral side surface 40 extending therebetween and a first insert axis A1 extending therethrough, and at least one first insert front major cutting edge 42 formed at the intersection of the first insert front end surface 36 and the first insert peripheral side surface 40.

In some embodiments of the present invention, the first cutting insert 24 may exhibit rotational symmetry about the first insert axis A1.

As shown in FIGS. 3 and 4, one of the at least one first insert front major cutting edge 42 is operative.

In some embodiments of the present invention, two first insert front major cutting edges 42 may be formed at the intersection of the first insert front end surface 36 and the first insert peripheral side surface 40, and the two first insert front major cutting edges 42 may be spaced apart by two first insert front minor cutting edges 44.

Also in some embodiments of the present invention, the first insert front and back end surfaces 36, 38 may be non-identical.

Further in some embodiments of the present invention, no cutting edges may be formed at the intersection of the first insert back end surface 38 and the first insert peripheral side surface 40.

Figure 13:
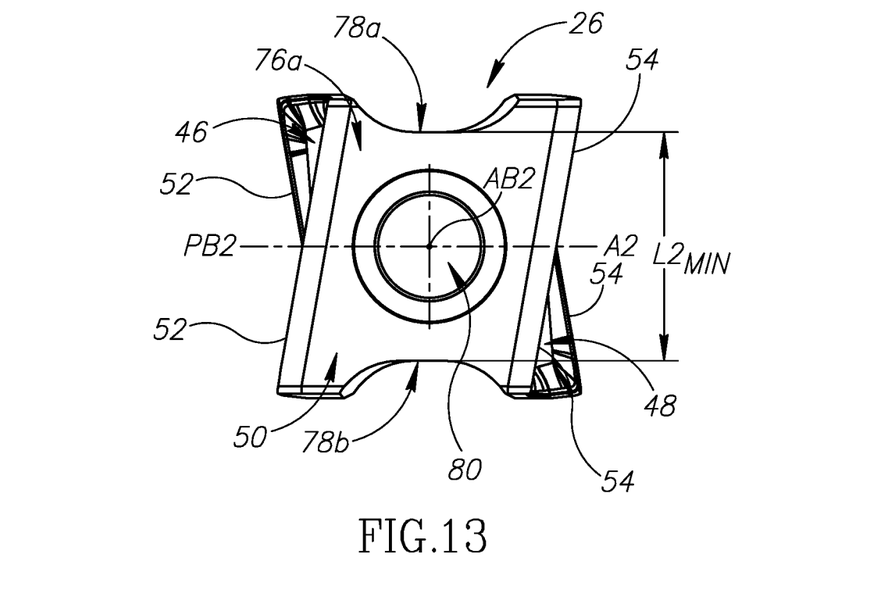
FIG. 13 is a major side view of the second cutting insert.
Figure 14:
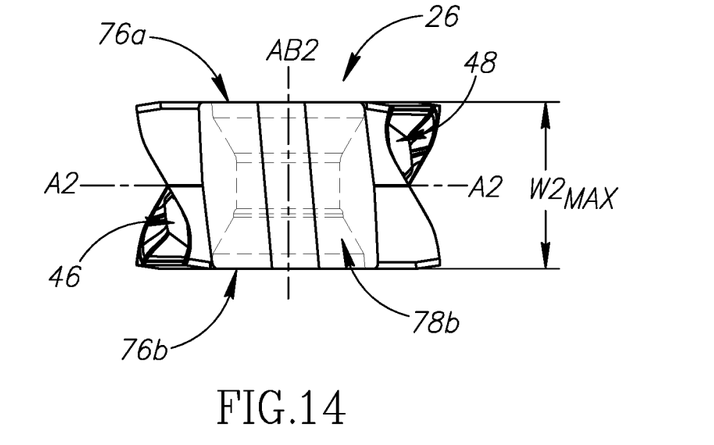
FIG. 14 is a minor side view of the second cutting insert.

As shown in FIGS. 13 and 14, the second cutting insert 26 has opposing second insert front and back end surfaces 46, 48 with a second insert peripheral side surface 50 extending therebetween and a second insert axis A2 extending therethrough, and at least one second insert front major cutting edge 52 formed at the intersection of the second insert front end surface 46 and the second insert peripheral side surface 50.

In some embodiments of the present invention, the second cutting insert 26 may exhibit rotational symmetry about the second insert axis A2.

As shown in FIGS. 3 and 4, one of the at least one second insert front major cutting edge 52 is operative.

In some embodiments of the present invention, two spaced apart second insert front major cutting edges 52 may be formed at the intersection of the second insert front end surface 46 and the second insert peripheral side surface 50.

Also in some embodiments of the present invention, the second insert front and back end surfaces 46, 48 may be identical, and at least one second insert back major cutting edge 54 may be formed at the intersection of the second insert back end surface 46 and the second insert peripheral side surface 50.

As shown in FIGS. 3, 4, 7 and 8, the first insert receiving pocket 28 has a first insert seat surface 56 with a first insert axial support wall 58 transverse thereto, and the first insert seat surface 56 is in contact with a first portion of the first insert peripheral side surface 40, providing radial support for the first cutting insert 24, and the first insert axial support wall 58 is in contact with a second portion of the first insert peripheral side surface 40, providing axial support for the first cutting insert 24.

In some embodiments of the present invention, the first insert seat surface 56 may be planar.

Also in some embodiments of the present invention, the first insert seat surface 56 may be contiguous with the forward end surface 32 of the cutting body 22.

Figure 6:
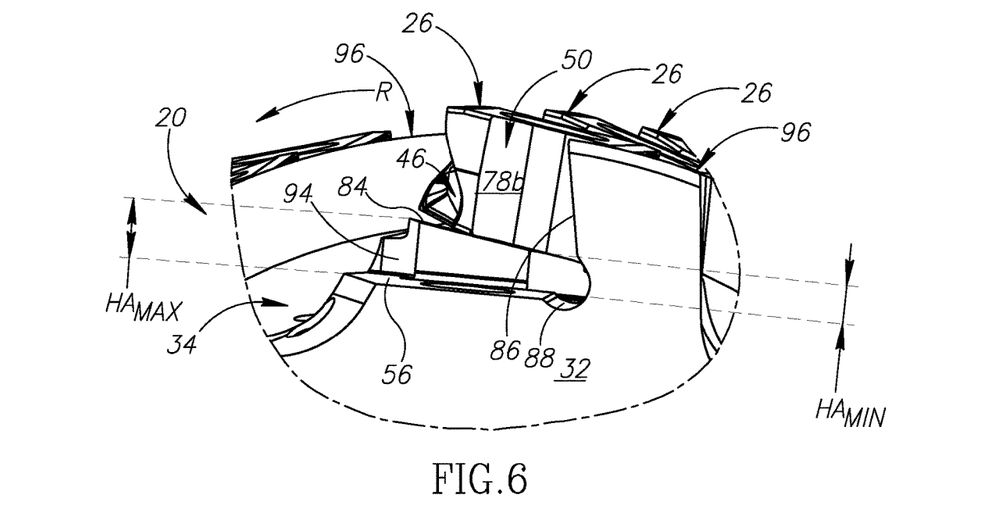
FIG. 6 is an end view of the cutting tool shown in FIG. 5.
Figure 7:
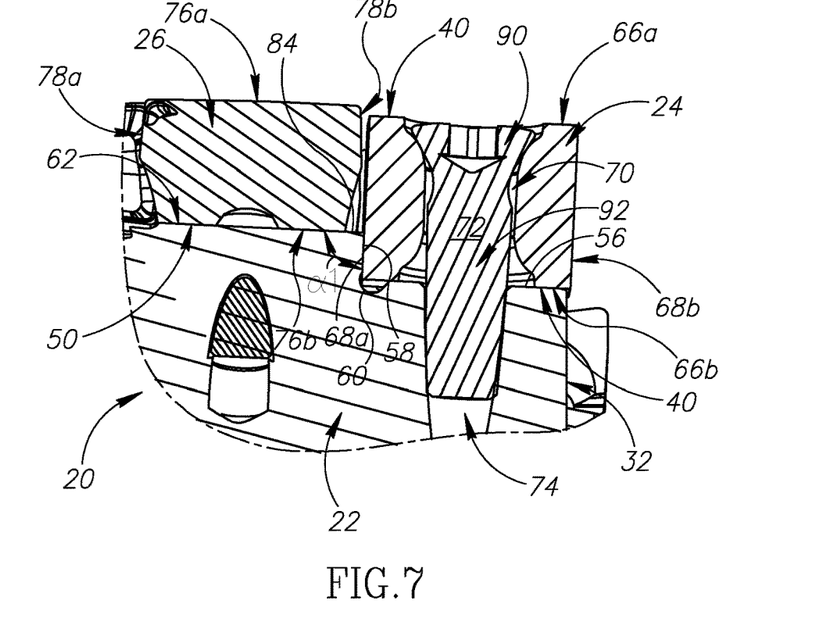
FIG. 7 is a cross-sectional view of the cutting tool shown in FIG. 4, taken along the line VII-VII.

As shown in FIGS. 6 and 7, the first insert axial support wall 58 may be located radially outward of the first insert seat surface 56.

It should be appreciated that FIG. 6 is an end view of the cutting tool 20 viewed along the tool axis AT.

In some embodiments of the present invention, the first insert axial support wall 58 may be spaced apart from the first insert seat surface 56 by a first insert axial stress relief groove 60.

Also in some embodiments of the present invention, the first insert axial support wall 58 may be planar.

Further in some embodiments of the present invention, the first insert peripheral side surface 40 may be in contact with the entire first insert axial support wall 58.

As shown in FIGS. 3 and 4, the second insert receiving pocket 30 may have a second insert seat surface 62 with a second insert tangential support wall 64 transverse thereto.

In some embodiments of the present invention, as shown in FIG. 7, the second insert seat surface 62 may be in contact with the second insert peripheral side surface 50, providing radial support for the second cutting insert 26.

Also in some embodiments of the present invention, the second insert seat surface 62 may be planar.

Further in some embodiments of the present invention, as shown in FIG. 7, the entire second insert seat surface 62 may be located radially outward of the first insert seat surface 56.

It should be appreciated that configuring the second insert seat surface 62 to be located radially outward of the first insert seat surface 56 enables the formation of the first insert axial support wall 58.

Yet further in some embodiments of the present invention, the second insert tangential support wall 64 may be in contact with the second insert back end surface 48, providing tangential support for the second cutting insert 26, and the second insert front end surface 46 may be located rotationally forward of the second insert back end surface 48.

As shown in FIGS. 9 to 12, the first insert peripheral side surface 40 may include two opposing first insert major side surfaces 66a, 66b and two opposing first insert minor side surfaces 68a, 68b.

In some embodiments of the present invention, as shown in FIG. 7, one of the two first insert major side surfaces 66a, 66b may be in contact with the first insert seat surface 56, and one of the two first insert minor side surfaces 68a, 68b may be in contact with the first insert axial support wall 58.

Also in some embodiments of the present invention, one of the two first insert minor side surfaces 68a, 68b may be in contact with the entire first insert axial support wall 58.

Further in some embodiments of the present invention, each of the two first insert major side surfaces 66a, 66b and each of the two first insert minor side surfaces 68a, 68b may be contiguous with the first insert back end surface 38.

As shown in FIGS. 9 to 12, the first cutting insert 24 may have a first insert minimum length $L1_{MIN}$ measured as the shortest distance between the two first minor side surfaces 68a, 68b, and a first insert maximum width $W1_{MAX}$ between the two first insert major side surfaces 66a, 66b measured perpendicular to the first insert axis A1 and the first insert minimum length $L1_{MIN}$.

In some embodiments of the present invention, the first insert minimum length $L1_{MIN}$ may be greater than the first insert maximum width $W1_{MAX}$.

Also in some embodiments of the present invention, each of the at least one first insert front major cutting edge 42 may be formed at the intersection of the first insert front end surface 36 and one of the two first insert major side surfaces 66a, 66b.

Further in some embodiments of the present invention, each of the two first insert front minor cutting edges 44 may be formed at the intersection of the first insert front end surface 36 and one of the two first minor side surfaces 68a, 68b.

Figure 9:
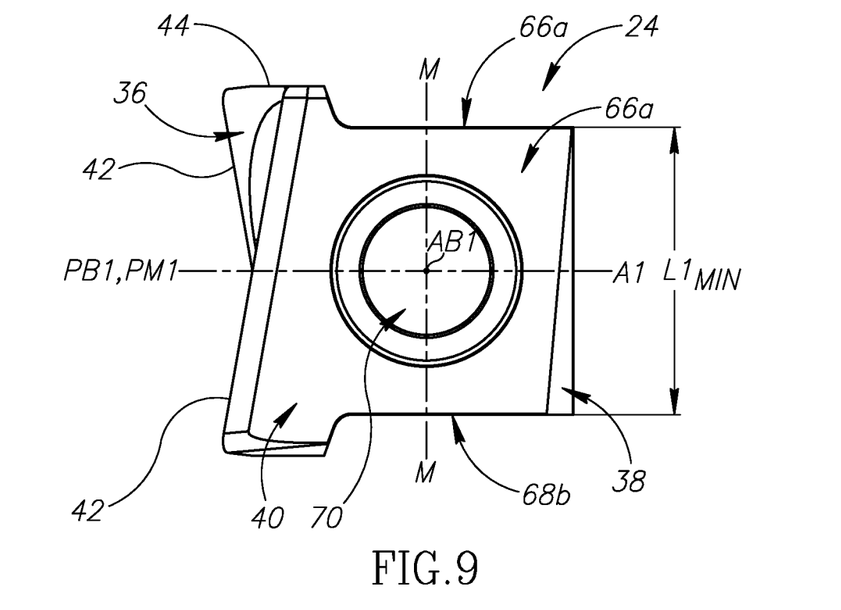
FIG. 9 is a major side view of the first cutting insert.
Figure 10:
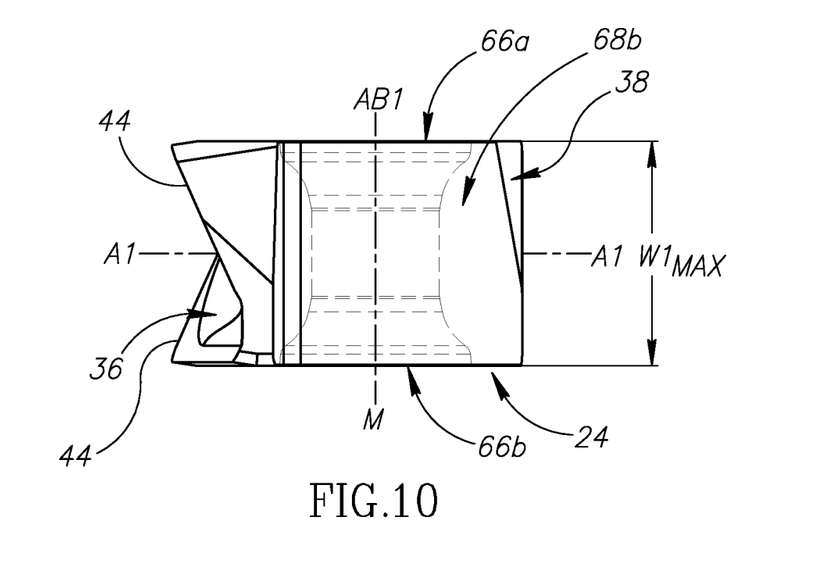
FIG. 10 is a minor side view of the first cutting insert.
Figure 12:
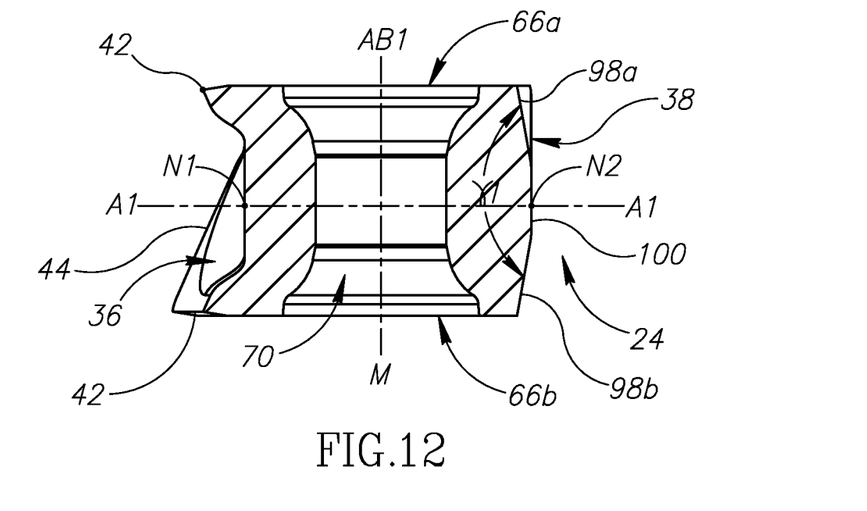
FIG. 12 is a cross-sectional view of the first cutting insert shown in FIG. 11, taken along the line XII-XII.

As shown in FIGS. 9 and 12, a first insert through bore 70 may extend between and open out to the two first insert major side surfaces 66a, 66b.

In some embodiments of the present invention, the first insert through bore 70 may extend along a first insert bore axis AB1, and the first insert maximum width $W1_{MAX}$ may be measured parallel to the first insert bore axis AB1.

Also in some embodiments of the present invention, a first insert bore plane PB1 may contain the first insert bore axis AB1 and the first insert axis A1, and the first insert minimum length $L1_{MIN}$ may be measured perpendicular to the first insert bore plane PB1.

As shown in FIGS. 3, 4, 7 and 8, a first clamping screw 72 may extend through the first insert through bore 70 and threadingly engage a first screw bore 74 in the first insert seat surface 56.

As shown in FIG. 13 and 14, the second insert peripheral side surface 50 may include two opposing second insert major side surfaces 76a, 76b and two opposing second insert minor side surfaces 78a, 78b.

In some embodiments of the present invention, as shown in FIG. 7, one of the two second insert major side surfaces 76a, 76b may be in contact with the second insert seat surface 62.

As shown in FIGS. 13 and 14, the second cutting insert 26 may have a second insert minimum length $L2_{MIN}$ measured as the shortest distance between the two second minor side surfaces 78a, 78b, and a second insert maximum width $W2_{MAX}$ between the two second insert major side surfaces 76a, 76b measured perpendicular to the second insert axis A2 and the second insert minimum length $L2_{MIN}$.

In some embodiments of the present invention, the second insert minimum length $L2_{MIN}$ may be greater than the second insert maximum width $W2_{MAX}$.

Also in some embodiments of the present invention, the first insert maximum width $W1_{MAX}$ may be greater than the second insert maximum width $W2_{MAX}$.

Further in some embodiments of the present invention, the first insert maximum width $W1_{MAX}$ may be at least six-fifths of the second insert maximum width $W2_{MAX}$.

It should be appreciated that configuring the first insert maximum width $W1_{MAX}$ to be greater than the second insert maximum width $W2_{MAX}$ enables stable mounting of the first and second cutting inserts 24, 26 in their respective first and second insert receiving pockets 28, 30, whilst arranging the operative first and second insert front major cutting edges 42, 52 to perform machining operations at the same cutting diameter.

As shown in FIGS. 13 and 14, a second insert through bore 80 may extend between and open out to the two second insert major side surfaces 76a, 76b.

In some embodiments of the present invention, the second insert through bore 80 may extend along a second insert bore axis AB2, and the second insert maximum width $W2_{MAX}$ may be measured parallel to the second insert bore axis AB2.

Also in some embodiments of the present invention, a second insert bore plane PB2 may contain the second insert bore axis AB2 and the second insert axis A2, and the second insert minimum length $L2_{MIN}$ may be measured perpendicular to the second insert bore plane PB2.

Further in some embodiments of the present invention, the second cutting insert 26 may exhibit rotational symmetry about the second insert bore axis AB2.

As shown in FIGS. 3 and 4, a second clamping screw 82 may extend through the second insert through bore 80 and threadingly engage a second screw bore 102 in the second insert seat surface 62.

As shown in FIG. 4, a second tool plane PT2 perpendicular to the tool axis AT intersects the operative first insert front major cutting edge 42 and the operative second insert front major cutting edge 52, or in other words, the operative first and second insert front major cutting edges 42, 52 axially overlap.

In some embodiments of the present invention, the second tool plane PT2 may intersect each of the least one first insert front major cutting edge 42 and each of the least one second insert front major cutting edge 52.

For embodiments of the present invention in which the second insert front and back end surfaces 46, 48 are identical, the second tool plane PT2 may also intersect each of the least one second insert back major cutting edge 54.

As shown in FIGS. 1 and 2, the cutting tool 20 may also have a plurality of second cutting inserts 26 arranged along the chip flute 34 with axially overlapping operative second insert front major cutting edges 52.

It should be appreciated that configuring the second tool plane PT2 to intersect the operative first insert and operative second insert front major cutting edges 42, 52 advantageously enables the provision of a continuous cutting edge along the chip flute 34.

As shown in FIG. 4, in a side view of the cutting tool 20 perpendicular to the tool axis AT, a raised shoulder surface 84 adjacent the first insert axial support wall 58 is at least partially obscured by the second cutting insert 26.

It should be appreciated that configuring the raised shoulder surface 84 to be at least partially obscured by the second cutting insert 26 advantageously enables the first and second cutting inserts 24, 26 to be arranged in close axial proximity, whilst the first insert axial support wall 58 provides axial support for the first cutting insert 24.

It should also be appreciated that the provision of axial support for the first cutting insert 24 is an important requirement, as the first insert receiving pocket 28 opens out at the forward end surface 32 of the cutting body 22, and the first cutting insert 24 is subjected to substantial axial cutting forces during machining operations.

As shown in FIGS. 6 and 7, the shoulder surface 84 may be spaced apart from the first insert seat surface 56 by the first insert axial support wall 58.

In some embodiments of the present invention, the shoulder surface 84 may be located radially outward of the first insert seat surface 56.

Also in some embodiments of the present invention, as shown in FIG. 4, the second tool plane PT2 may intersect the shoulder surface 84.

Further in some embodiments of the present invention, the shoulder surface 84 may be contiguous with the first insert axial support wall 58.

As shown in FIG. 4, in the side view of the cutting tool 20, no portion of the shoulder surface 84 may be obscured by the first cutting insert 24.

In some embodiments of the present invention, the shoulder surface 84 may form a portion of the second insert seat surface 62.

It should be appreciated that for embodiments of the present invention that the second insert seat surface 62 is planar, the shoulder surface 84 may be a coplanar extension thereof.

In some embodiments of the present invention, as shown in FIG. 7, one of the two second insert major side surfaces 76a, 76b may be in contact with the shoulder surface 84.

In other embodiments of the present invention (not shown), the shoulder surface 84 may be distinct from the second insert seat surface 62, for example, offset therefrom or inclined thereto, such that neither of the two second insert major side surfaces 76a, 76b are in contact with the shoulder surface 84.

As shown in FIGS. 4 and 7, the first tool plane PT1 may intersect the shoulder surface 84 and the first insert peripheral side surface 40.

In some embodiments of the present invention, the first tool plane PT1 may intersect the first insert axial support wall 58.

As shown in FIG. 7, in a cross-section taken in the first tool plane PT1, the shoulder surface 84 and the first insert axial support wall 58 may form an internal first pocket angle $\alpha 1$. More particularly, in this cross-section, the shoulder surface 84 and the first insert axial support wall 58 form a step having the aforementioned internal first pocket angle $\alpha 1$.

In some embodiments of the present invention, the first pocket angle $\alpha 1$ may have a range from 70 to 110 degrees.

It should also be appreciated that use of the terms "internal angle" and "external angle" throughout the description and claims refers to an angle between two surface components of a pair of surfaces as measured internal and external to the member on which the two surface components are formed, respectively.

As shown in FIG. 12, the first insert axis A1 may intersect the first insert front and back end surfaces 36, 38 at front and back end points N1, N2, respectively, and a first insert median plane M perpendicular to the first insert axis A1 may be located midway between the front and back end points N1, N2.

Figure 5:
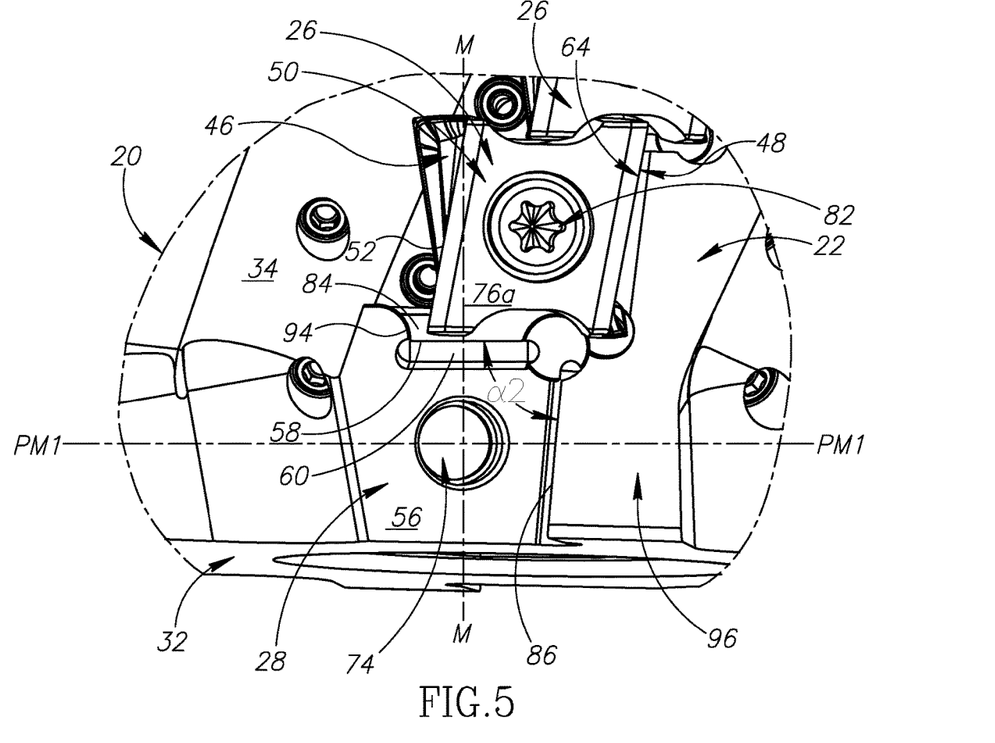
FIG. 5 is a detailed side view of the cutting tool, taken perpendicular a first insert seat surface of a first insert receiving pocket, with the associated first cutting insert and its first clamping screw removed.

In some embodiments of the present invention, as shown in FIG. 5, the first insert median plane M may intersect the first insert axial support wall 58 and the second cutting insert 26.

Also in some embodiments of the present invention, the first insert median plane M may intersect the shoulder surface 84.

It should be appreciated that although FIG. 5 shows a side view of the cutting tool 20, with the first cutting insert 24 and the first clamping screw 72 removed, the first insert median plane M associated with the first cutting insert 24 is shown.

It should be appreciated that for embodiments of the present invention in which the first insert peripheral side surface 40 is in contact with the entire first insert axial support wall 58, configuring the first insert median plane M to intersect the first insert axial support wall 58 and the second cutting insert 26, advantageously enables the helix angle of the chip flute 34 to be minimized whilst providing central and stable axial support for the first cutting insert 24.

As shown in FIGS. 3, 4, 6 and 8, the first insert receiving pocket 28 may include a first insert tangential support wall 86 transverse to the first insert seat surface 56, and the first insert tangential support wall 86 may be in contact with the first insert back end surface 38, providing tangential support for the first cutting insert 24.

In some embodiments of the present invention, as shown in FIGS. 3 and 6, the first insert tangential support wall 86 may face the direction of rotation R.

Also in some embodiments of the present invention, the first insert tangential support wall 86 may be contiguous with the forward end surface 32 of the cutting body 22.

Further in some embodiments of the present invention, the first insert tangential support wall 86 may be planar.

As shown in FIG. 5, in a side view of the cutting body 22, the first insert axial and first insert tangential support walls 58, 86 form an external acute second pocket angle $\alpha 2$.

In some embodiments of the present invention, the second pocket angle $\alpha 2$ may have a range from 75 to 88 degrees.

It should be appreciated that with respect to the first insert receiving pocket 28, FIG. 5 also represents a side view of the cutting body 22, in view of the first cutting insert 24 and the first clamping screw 72 being removed.

It should also be appreciated that configuring the first insert axial and first insert tangential support walls 58, 86 to form an external acute second pocket angle $\alpha 2$ results in tangential cutting forces acting on the first insert tangential support wall 86 being partially directed towards the first insert axial support wall 58, and axial cutting forces acting on the first insert axial support wall 58 being partially directed towards the first insert tangential support wall 86, which advantageously results in a stable clamping arrangement and reduced axial and tangential cutting forces acting on the first clamping screw 72 during machining operations.

Figure 8:
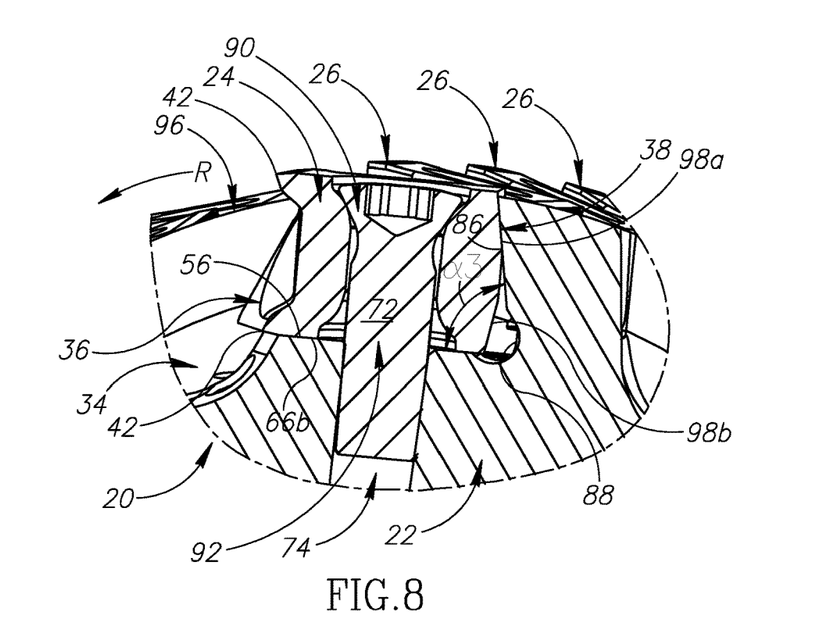
FIG. 8 is a cross-sectional view of the cutting tool shown in FIG. 4, taken along the line VIII-VIII.

As shown in FIGS. 6 and 8, the first insert tangential support wall 86 may be located radially outward of the first insert seat surface 56.

Yet further in some embodiments of the present invention, the first insert tangential support wall 86 may be spaced apart from the first insert seat surface 56 by a first insert tangential stress relief groove 88.

As shown in FIG. 8, in a cross-section taken in a third tool plane PT3 perpendicular to the tool axis AT and intersecting the first insert seat surface 56 and the first insert tangential support wall 86, the first insert seat surface 56 and the first insert tangential support wall 86 may form an external acute third pocket angle $\alpha 3$.

In some embodiments of the present invention, the third pocket angle $\alpha 3$ may have a range from 65 to 85 degrees.

Also in some embodiments of the present invention, the third tool plane PT3 may intersect each of the at least one first insert front major cutting edge 42.

It should be appreciated that configuring the first insert seat surface 56 and the first insert tangential support wall 86 to form an external acute third pocket angle $\alpha 3$ results in tangential cutting forces acting on the first insert tangential support wall 86 being partially directed towards the first insert seat surface 56, which advantageously results in a stable clamping arrangement and reduced tangential cutting forces acting on the first clamping screw 72 during machining operations.

As shown in FIG. 7, the first clamping screw 72 may have a first head portion 90 and a first shank portion 92 extending therefrom, and the first head portion 90 may be entirely located radially outward of the shoulder surface 84.

It should be appreciated that configuring the first head portion 90 to be entirely located radially outward of the shoulder surface 84 results in clamping contact between the first head portion 90 and the first through bore 70 radially outward of the first insert axial support wall 58.

As shown in FIGS. 3 and 4, a tangential end wall 94 contiguous with the shoulder surface 84 may face the direction of rotation R, and the tangential end wall 94 may be located rotationally forward of the first insert tangential support wall 86. In some embodiments of the present invention, as shown in FIG. 4, the second tool plane PT2 may intersect the tangential end wall 94.

Also in some embodiments of the present invention, the tangential end wall 94 may be contiguous with the first insert axial support wall 58.

As seen in FIG. 6, the first insert axial support wall 58 may have a height above the first insert seat surface 56 that varies. For example, the height of the first insert axial support wall 58 may increase in the direction of rotation R. The height of the first insert axial support wall 58 above the first insert seat surface 56 may vary from an axial support wall minimum height $HA_{MIN}$ closest to the first insert tangential support wall 86 to an axial support wall maximum height $HA_{MAX}$ closest to the tangential end wall 94.

To provide an adequate surface area for axial support of the first cutting insert 24, the minimum height $HA_{MIN}$ of the first insert axial support wall 58 is preferably no less than 15% of the first insert maximum width $W1_{MAX}$.

Further in some embodiments of the present invention, the tangential end wall 94 may not make contact with the first cutting insert 24.

As shown in FIGS. 1, 6 and 8, the cutting body 22 may have a cylindrical outer peripheral surface 96 extending axially rearwardly from the forward end surface 32, and the first insert tangential support wall 86 may intersect the outer peripheral surface 96.

It should be appreciated that for embodiments of the present invention that the shoulder surface 84 is located radially outward of the first insert seat surface 56, the shoulder surface 84 may also be located radially inward of the outer peripheral surface 96.

Figure 11:
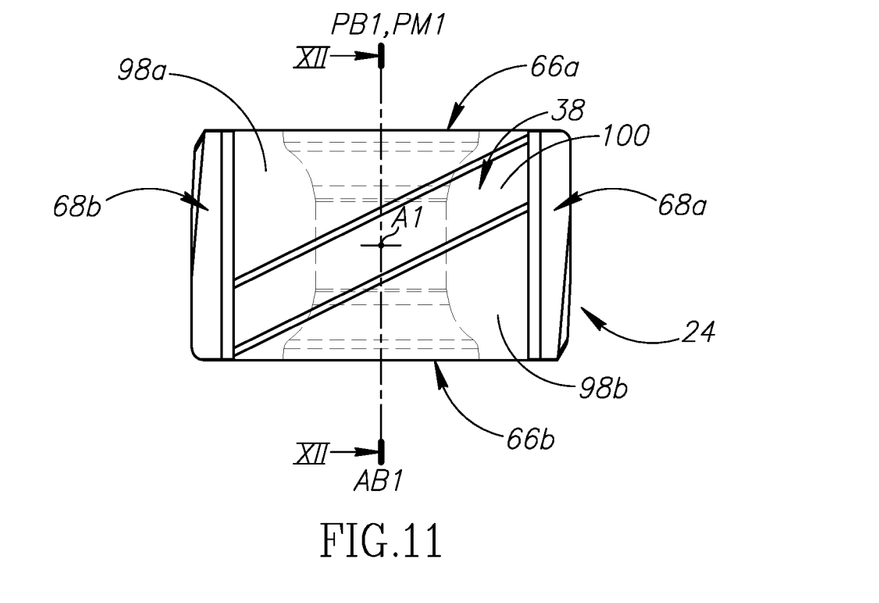
FIG. 11 is a rear end view of the first cutting insert.

In some embodiments of the present invention, as shown in FIGS. 8 and 11, the first insert back end surface 38 may have a pair of first insert back abutment surfaces 98a, 98b, and only one of the two first insert back abutment surfaces 98a, 98b may be in contact with the first insert tangential support wall 86, with contact occurring at the radially outermost portion of the first insert tangential support wall 86.

Also in some embodiments of the present invention, the pair of first insert back abutment surfaces 98a, 98b may be spaced apart by an intermediate surface 100.

It should be appreciated that apart from only one of the two first insert back abutment surfaces 98a, 98b being in contact with the first insert tangential support wall 86, no other portion of the first insert back end surface 38 is in contact with the first insert receiving pocket 28.

It should also be appreciated that configuring the radially outermost portion of the first insert tangential support wall 86 to be in contact with the first insert back end surface 38 results in tangential support for the first cutting insert 24 being provided radially outward of the region of clamping contact between the first head portion 90 and the first insert through bore 70, which advantageously results in a stable clamping arrangement and reduced tangential cutting forces acting on the first clamping screw 72 during machining operations.

As shown in FIG. 12, in a cross-section taken in a first insert major plane PM1 containing the first insert axis A1, the first insert back end surface 38 may have a convex shape.

In some embodiments of the present invention, in the cross-section taken in the first insert major plane PM1, the pair of first insert back abutment surfaces 98a, 98b may form an internal obtuse first insert angle $\gamma 1$.

Also in some embodiments of the present invention, the first insert major plane PM1 may intersect each of the at least one first insert front major cutting edge 42.

Further in some embodiments of the present invention, the first insert angle $\gamma 1$ may have a range from 130 to 170 degrees.

It should be appreciated that the first insert angle $\gamma 1$ may be approximately twice the third pocket angle $\alpha 3$, to ensure adequate contact between one of the two first insert back abutment surfaces 98a, 98b and the first insert tangential support wall 86 in each index position of the first cutting insert 24.

In some embodiments of the present invention, the first insert major plane PM1 and the first insert bore plane PB1 may be coplanar.

Also in some embodiments of the present invention, as shown in FIG. 5, the first insert major plane PM1 may intersect the outer peripheral surface 96 along its entire circumference.

It should be appreciated that although FIG. 5 shows a side view of the cutting tool 20, with the first cutting insert 24 and the first clamping screw 72 removed, the first insert major plane PM1 associated with the first cutting insert 24 is shown.

As shown in FIG. 4, the operative first insert front major cutting edge 42 may have a positive first insert axial rake angle $\beta 1$, and the operative second insert front major cutting edge 52 may have a positive second axial rake angle $\beta 2$.

For embodiments of the present invention in which the second insert front and back end surfaces 46, 48 are identical and the second insert front end surface 46 is in contact with the second insert tangential support wall 64 (not shown), the operative second insert back major cutting edge 54 may have a positive second insert axial rake angle $\beta 2$.

Although the present invention has been described to a certain degree of particularity, it should be understood that various alterations and modifications could be made without departing from the spirit or scope of the invention as hereinafter claimed.

What is claimed is:

1. A cutting tool (20) rotatable about a tool axis (AT) defining a forward-rearward direction ($D_F$, $D_R$) and having a direction of rotation (R), the cutting tool (20) comprising:
    a cutting body (22) having:
        a forward end surface (32);
        a first insert receiving pocket (28) opening out to the forward end surface (32) and having a first insert seat surface (56) with a first insert axial support wall (58) transverse thereto;
        a second insert receiving pocket (30) located axially rearward of the first insert receiving pocket (28) and having a second insert seat surface (62); and a raised shoulder surface (84) adjacent the first insert axial support wall (58);

a first cutting insert (24) removably secured in the first insert receiving pocket (28), the first cutting insert (24) having opposing first insert front and back end surfaces (36, 38) with a first insert peripheral side surface (40) extending therebetween and a first insert axis (A1) extending therethrough, and at least one first insert front major cutting edge (42) formed at the intersection of the first insert front end surface (36) and the first insert peripheral side surface (40), and a second cutting insert (26) removably secured in the second insert receiving pocket (30), the second cutting insert (26) having opposing second insert front and back end surfaces (46, 48) with a second insert peripheral side surface (50) extending therebetween and a second insert axis (A2) extending therethrough, and at least one second insert front major cutting edge (52) formed at the intersection of the second insert front end surface (46) and the second insert peripheral side surface (50), wherein:

the first insert seat surface (56) contacts a first portion of the first insert peripheral side surface (40), the first insert axial support wall (58) contacts a second portion of the first insert peripheral side surface (40), one of the at least one first insert front major cutting edge (42) is operative and one of the at least one second insert front major cutting edge (52) is operative, a second tool plane (PT2) perpendicular to the tool axis (AT) intersects the operative first insert front major cutting edge (42) and the operative second insert front major cutting edge (52), and in a side view of the cutting tool (20) perpendicular to the tool axis (AT), the raised shoulder surface (84) is at least partially obscured by the second cutting insert (26).

2. The cutting tool (20) according to claim 1, wherein:
the first insert receiving pocket (28) includes a first insert tangential support wall (86) transverse to the first insert seat surface (56), and
the first insert tangential support wall (86) contacts the first insert back end surface (38).

3. The cutting tool (20) according to claim 2, wherein:
in a side view of the cutting body (22), the first insert axial and first insert tangential support walls (58, 86) form an external acute second pocket angle ($\alpha 2$).

4. The cutting tool (20) according to claim 2, wherein in a cross-section taken in a third tool plane (PT3) perpendicular to the tool axis (AT) and intersecting the first insert seat surface (56) and the first insert tangential support wall (86), the first insert seat surface (56) and the first insert tangential support wall (86) form an external acute third pocket angle ($\alpha 3$).

5. The cutting tool (20) according to claim 2, wherein:
the first insert tangential support wall (86) faces the direction of rotation (R).

6. The cutting tool (20) according to claim 5, wherein:
a tangential end wall (94) contiguous with the shoulder surface (84) faces the direction of rotation (R), and
the tangential end wall (94) is located rotationally forward of the first insert tangential support wall (86).

7. The cutting tool (20) according to claim 2, wherein:
the cutting body (22) has a cylindrical outer peripheral surface (96) extending axially rearwardly from the forward end surface (32), and the first insert tangential support wall (86) intersects the outer peripheral surface (96).

8. The cutting tool (20) according to claim 7, wherein:
the first insert back end surface (38) has a pair of first back abutment surfaces (98a, 98b), and
only one of the two first back abutment surfaces (98a, 98b) is in contact with the first insert tangential support wall (86), with contact occurring at the radially outermost portion of the first insert tangential support wall (86).

9. The cutting tool (20) according to claim 8, wherein in a cross-section taken in a first insert major plane (PM1) containing the first insert axis (A1), the first insert back end surface (38) has a convex shape.

10. The cutting tool (20) according to claim 9, wherein in the cross-section taken in the first insert major plane (PM1), the pair of first insert back abutment surfaces (98a, 98b) form an internal obtuse first insert angle ($\alpha 1$).

11. The cutting tool (20) according to claim 1, wherein:
the first insert peripheral side surface (40) includes two opposing first insert major side surfaces (66a, 66b) and two opposing first minor side surfaces (68a, 68b),
one of the two first insert major side surfaces (66a, 66b) is in contact with the first insert seat surface (56), and
one of the two first insert minor side surfaces (68a, 68b) is in contact with the first insert axial support wall (58).

12. The cutting tool (20) according to claim 11, wherein:
the first cutting insert (24) has a first insert minimum length ($L1_{MIN}$) measured as the shortest distance between the two first minor side surfaces (68a, 68b), and a first insert maximum width ($W1_{MAX}$) between the two first insert major side surfaces (66a, 66b) measured perpendicular to the first insert axis (A1) and the first insert minimum length ($W1_{MIN}$), and
the first insert minimum length ($L1_{MIN}$) is greater than the first insert maximum width ($W1_{MAX}$).

13. The cutting tool (20) according to claim 12, wherein a first insert through bore (70) extends between and opens out to the two first insert major side surfaces (66a, 66b).

14. The cutting tool (20) according to claim 13, wherein a first clamping screw (72) extends through the first insert through bore (70) and threadingly engages a first screw bore (74) in the first insert seat surface (56).

15. The cutting tool (20) according to claim 14, wherein:
the first clamping screw (72) has a first head portion (90) and a first shank portion (92) extending therefrom, and
the first head portion (90) is entirely located radially outward of the shoulder surface (84).

16. The cutting tool (20) according to claim 12, wherein:
the second insert peripheral side surface (50) includes two opposing second insert major side surfaces (76a, 76b) and two opposing second insert minor side surfaces (78a, 78b), and
one of the two second insert major side surfaces (76a, 76b) is in contact with the shoulder surface (84).

17. The cutting tool (20) according to claim 16, wherein:
the second cutting insert (26) has a second insert minimum length ($L2_{MIN}$) measured as the shortest distance between the two second minor side surfaces (78a, 78b), and a second insert maximum width ($W2_{MAX}$) between the two second insert major side surfaces (76a, 76b) measured perpendicular to the second insert axis (A2) and the second insert minimum length ($L2_{MIN}$), and
the second insert minimum length ($L2_{MIN}$) is greater than the second insert maximum width ($W2_{MAX}$).

18. The cutting tool (20) according to claim 17, wherein the first insert maximum width ($W1_{MAX}$) is greater than the second insert maximum width ($W2_{MAX}$).

19. The cutting tool (20) according to claim 1, wherein the second insert receiving pocket (30) has a second insert tangential support wall (64) transverse to the second insert seat surface (62).

20. The cutting tool (20) according to claim 19, wherein the shoulder surface (84) forms a portion of the second insert seat surface (62).

21. The cutting tool (20) according to claim 19, wherein the entire second insert seat surface (62) is located radially outward of the first insert seat surface (56).

22. The cutting tool (20) according to claim 1, wherein a first tool plane (PT1) containing the tool axis (AT) intersects the first and second cutting inserts (24, 26).

23. The cutting tool (20) according to claim 22, wherein the first tool plane (PT1) intersects the shoulder surface (84) and the first insert peripheral side surface (40).

24. The cutting tool (20) according to claim 22, wherein in a cross-section taken in the first tool plane (PT1), the shoulder surface (84) and the first insert axial support wall (58) form an internal first pocket angle ($\alpha1$).

25. The cutting tool (20) according to claim 1, wherein the shoulder surface (84) is contiguous with the first insert axial support wall (58).

26. The cutting tool (20) according to claim 1, wherein the second tool plane (PT2) intersects the shoulder surface (84).

27. The cutting tool (20) according to claim 1, wherein the first insert axial support wall (58) is located radially outward of the first insert seat surface (56).

28. The cutting tool (20) according to claim 1, wherein the shoulder surface (84) is spaced apart from the first insert seat surface (56) by the first insert axial support wall (58).

29. The cutting tool (20) according to claim 1, wherein the shoulder surface (84) is located radially outward of the first insert seat surface (56).

30. The cutting tool (20) according to claim 1, wherein the first insert peripheral side surface (40) is in contact with the entire first insert axial support wall (58).

31. The cutting tool (20) according to claim 1, wherein:
the first insert axis (A1) intersects the first insert front and back end surfaces (36, 38) at front and back end points (N1, N2), respectively,
a first insert median plane (M) perpendicular to the first insert axis (A1) is located midway between the front and back end points (N1, N2), and
the first insert median plane (M) intersects the first insert axial support wall (58) and the second cutting insert (26).

32. The cutting tool (20) according to claim 1, wherein:
in the side view of the cutting tool (20), no portion of the shoulder surface (84) is obscured by the first cutting insert (24).

33. The cutting tool (20) according to claim 1, wherein:
the first insert peripheral side surface (40) includes two opposing first insert major side surfaces (66a, 66b) and two opposing first minor side surfaces (68a, 68b),
the first cutting insert (24) has a first insert maximum width ($W1_{MAX}$) defined between the two first insert major side surfaces (66a, 66b),
the first insert axial support wall (58) has an axial support wall minimum height ($HA_{MIN}$) above the first insert seat surface (56), and
the axial support wall minimum height ($HA_{MIN}$) is no less than 15% of the first insert maximum width ($W1_{MAX}$).

34. The cutting tool (20) according to claim 33, wherein:
the first insert receiving pocket (28) includes a first insert tangential support wall (86) transverse to the first insert seat surface (56),
a tangential end wall (94) contiguous with the shoulder surface (84) faces in the direction of rotation (R) and is located rotationally forward of the first insert tangential support wall (86), and
a height of the first insert axial support wall (58) above the first insert seat surface (56) increases in the direction of rotation (R) from the first insert tangential support wall (86) to the tangential end wall (94).

\* \* \* \* \*